Oct. 1, 1929.   L. F. CARTER   1,729,734
BEARING FOR GYROSCOPIC APPARATUS
Filed Sept. 12, 1923
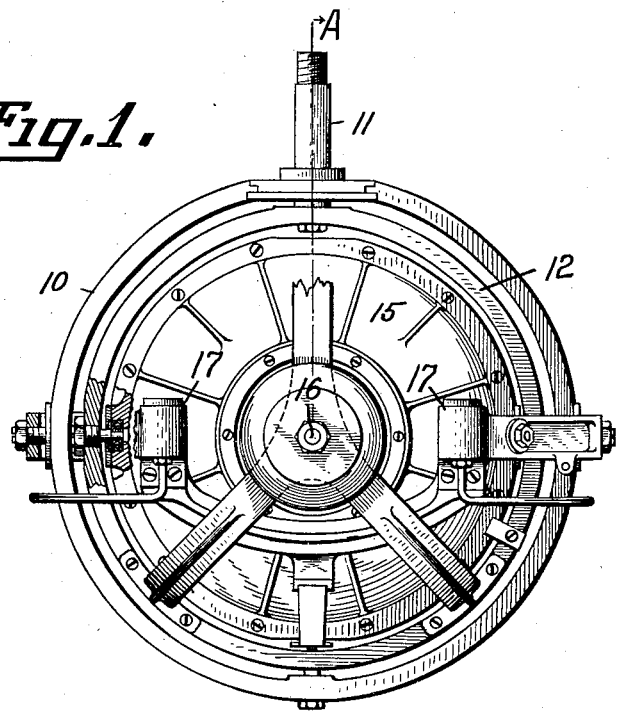
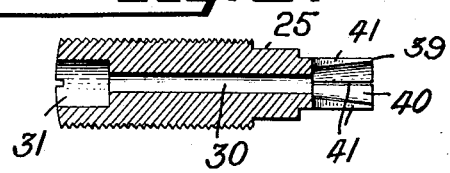
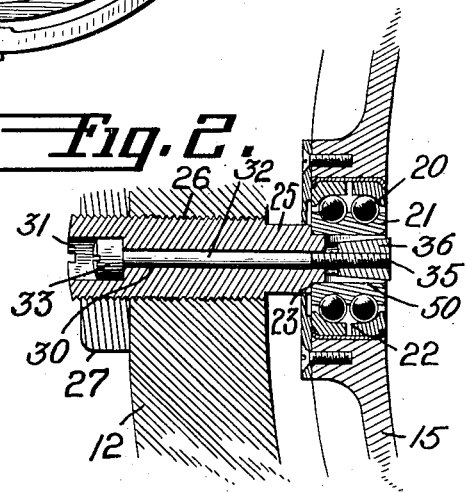
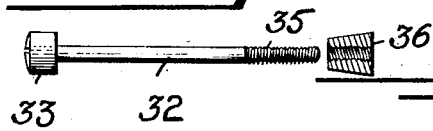
Inventor
Leslie F. Carter.
By his Attorney
Herbert H. Thompson Patented Oct. 1, 1929

1,729,734

UNITED STATES PATENT OFFICE

LESLIE F. CARTER, OF LEONIA, NEW JERSEY, ASSIGNOR, BY MESNE ASSIGNMENTS, TO SPERRY GYROSCOPE COMPANY, INC., A CORPORATION OF NEW YORK

BEARING FOR GYROSCOPIC APPARATUS

Application filed September 12, 1923. Serial No. 662,363.

This invention relates to gyroscopic compasses and has for its object the elimination of certain errors which may arise in the operation thereof. It has heretofore been the practice to support the gyro casing in which the rotor is mounted in bearings in the vertical ring with sufficient clearance to permit expansion of the casing due to the heat generated during the operation of the compass. This clearance was usually allowed in the bearings at both sides of the casing, so that said casing had a certain amount of free play laterally. This resulted in frequent lateral displacement of the rotor axis relative to the vertical axis of suspension of the sensitive element and as a result of such displacement, there were set up precessional movements upon change of course of a vessel in azimuth and in response to acceleration pressures. It is the principal object of this invention therefore, to provide means for preventing the hereinbefore mentioned lateral displacement and the errors arising therefrom, while at the same time permitting expansion of the casing in response to the heat generated during the normal operation of the compass.

It is a further object of my invention to accomplish the hereinbefore mentioned object by a simple structure which can be applied to present types of gyro compasses without material changes therein.

Further objects and advantages of this invention, more or less broad than those hereinbefore stated, will be in part obvious and in part specifically referred to in the following specification.

In the accompanying drawing in which I have shown what I now consider to be the preferred form of my invention, Fig. 1 is a front view of a phantom system and sensitive element of a gyroscopic compass with parts broken away to disclose my invention.

Fig. 2 is a vertical section through a bearing for the gyro casing, said bearing embodying my invention.

Fig. 3 is a side section through a stud for maintaining the vertical ring and the gyro casing in predetermined relation.

Fig. 4 is a side view, partly sectioned, of a locking means which cooperates with the stud shown in Fig. 3.

Fig. 5 is an end view of the stud shown in Fig. 3.

Referring to the drawings I have shown in Fig. 1 the phantom system and sensitive element of a gyroscopic compass which comprises essentially the phantom ring 10 carrying the suspension head 11, through which is adapted to extend a suspension element, such as a torsion wire (not shown), for suspending the vertical ring 12 within the phantom ring 10. Journaled within said vertical ring upon a horizontal axis is the gyro casing or support 15, within which is journaled the gyro rotor upon a horizontal axis 16 at right angles to the axis of oscillation of casing 15. The mercury ballistic system 17 is also shown mounted on ring 10 and connected to casing 15.

The casing 15 is mounted for oscillation upon ball bearings 20 in ball races 21, 22. The ball race 21 abuts against a shoulder 23 formed upon a stud 25, screw threaded as shown at 26 through the vertical ring 12 and locked in position on the outside of said ring by a locking nut 27. Heretofore, a certain amount of clearance was allowed between the shoulder 23 and the adjacent end of ball race 21, to permit expansion of the casing 15 in response to the heat generated by the operation of the rotor therein. It will be readily apparent that unless the limits of total expansion were very accurately predetermined, there would be a certain amount of clearance even after expansion. Indeed such clearance was necessary, for otherwise the gyroscope would stop because of the tight, binding fit. Even a small amount of such clearance, provided at each side of the casing 15, permitted a certain amount of lateral movement of said casing in either direction, with the probability that at no time would the casing be exactly centered with the axis of the rotor in the plane of the vertical axis of suspension. By lateral displacement is here meant the shifting of the gyro support or casing 15 (and hence, the rotor axis 16) bodily with respect to the axis of suspension in one direction or the other along axis of oscillation of the support 15. Even a small amount of displacement from said axis (in this case, the vertical axis of suspension) is sufficient to set up appreciable errors due to precession of the gyroscope in response to turning or acceleration pressures.

By this invention, I provide means for positioning one side of the casing or support 15 in predetermined relation to the vertical ring, that is, for resetting said casing a predetermined distance from said vertical ring, and for preventing lateral displacement of the support relative to said ring. For this purpose I provide said stud 25 with a longitudinal, preferably centrally disposed bore 30, terminating at the outer end in a larger counter-bore 31 to accommodate a locking stud having a stem 32 and a head 33 adapted to engage in said bore 30 and counterbore 31, respectively. The inner end of the locking stud is screw threaded as at 35 and is adapted to receive a locking or expander nut 36 which enters from the opposite side of the casing to that of the locking stud. The inner end of stud 25 is provided with an enlarged bore 40, the walls of which are slit by a plurality of saw cuts 41 to form a resilient end or expander head 39. The bore 40 is wedge shaped in cross-section, as is also the expander nut 36 adapted to fit therein. The expander head of the stud 25 insures a tight fit of the nut 36 therein, as said nut is screwed into said end by the stud 33, to press said resilient end against the walls of a bore 50 formed through the inner ball race 21 and to draw the casing 15 toward the vertical ring until the outer end of ball race 21 is in firm engagement with the shoulder 23 of the stud 25. By this arrangement, it will be apparent that the position of the casing 15 relative to the vertical ring at the respective side of the casing is fixed and cannot vary, so that at this side of the casing, no lateral displacement of the casing, and hence of the gyro axis, is possible, relative to the vertical axis of suspension.

Assuming that the locking means hereinbefore described is the left hand bearing in Fig. 1 as shown, the position of casing 15 relative to the vertical ring 12 will be initially adjusted so that the axis 16 is slightly displaced (in this case to the left) of the vertical axis of suspension indicated by the dotted line A. The right hand bearing may be an ordinary bearing of the type hereinbefore described, which provides for a certain amount of clearance between the end of the ball race, similar to ball race 21, and a shoulder similar to shoulder 23. This clearance permits the casing to expand under the heat generated during the normal operation of the gyroscope. The amount of initial displacement of the axis 16 to the left of the vertical axis A is made equivalent to the amount of expansion of the casing during the operation of the gyroscope, so that under normal operating conditions, the axis 16 will be exactly in the plane of the vertical axis A. This relative positioning of the casing 15 and the ring 12 will be maintained throughout the entire operation of the compass, since lateral play is impossible because the casing is locked relative to the ring by the locking arrangement shown in Figs. 1 and 2 at one side of the casing, and the only movement of the casing is that due to expansion under the heat of operation of the compass which can be determined so that after the compass once attains its normal operating speed, no further movements of the gyro casing relative to the vertical ring (or of the rotor axis relative to the vertical axis A) are possible.

The principles hereinbefore described are applicable wherever it is essential to maintain the rotor axis in some predetermined position, as for example, in the gyro pendulum, wherein a horizontal ring replaces the vertical ring 12, said horizontal ring being supported in standards on a horizontal axis at right angles to the axis of support of the ring.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a gyroscopic compass, a rotor, a support therefor, a ring in which said support is journaled, means for preventing lateral displacement of the axis of said rotor relative to said ring comprising an anchor bearing at one side of said support, and means permitting expansion of said support comprising a bearing allowing end play at the other side of said support.

2. In a gyroscopic compass, a rotor, a support therefor, a ring in which said support is journaled, a vertical suspension for said ring, and an anchor bearing between said support and ring at one side thereof for preventing lateral displacement of the axis of said rotor relative to the axis of suspension.

3. A horizontal bearing for supporting gyro-compasses, comprising a supporting stud having a bore, a bolt having a threaded end mounted therein, a wedge threaded on said bolt, a ball bearing race adapted to be clamped between said wedge and said stud, and a complementary race adapted to be secured in a part of the compass, said races being so formed as to prevent end play.

4. In a gyroscopic compass, a rotor, a support therefor, a ring in which said support is journaled, a vertical suspension for said ring, said support being initially positioned in said ring so that the axis of said rotor is laterally displaced from the axis of suspension, said support being so mounted within said ring that it is free to expand therein under the heat of normal operation to bring said rotor axis into the plane of the axis of suspension.

5. In a gyroscopic compass, a rotor, a support therefor, a ring in which said support is journaled, a vertical suspension for said ring, said support being initially positioned in said ring so that the axis of said rotor is laterally displaced from the axis of suspension by an amount equal to the lateral expansion of said support under the heat of normal operation, said support being so mounted within said ring that it is free to expand therein under the heat of normal operation to bring said rotor axis into the plane of the axis of suspension.

6. In a gyroscopic compass, a rotor, a support therefor, a ring in which said support is journaled, an anchor bearing positioning said support a predetermined distance from said ring and preventing lateral displacement of said support relative to said ring, and a complementary bearing permitting expansion of said support.

7. In a gyroscopic compass, a rotor, a support therefor, a ring in which said support is journaled, means for positioning said support at one part thereof a predetermined distance from said ring and for preventing lateral displacement of said support relative to said ring, said support being so mounted in said ring that it is free to expand at other parts thereof.

8. In a gyroscopic compass, a rotor, a support therefor, a ring in which said support is journaled, means for positioning said support at one part thereof a predetermined distance from said ring and for preventing lateral displacement of said support relative to said ring, said support being so mounted in said ring that it is free to expand at the opposite part thereof.

9. In a gyroscopic compass, a rotor, a support therefor, means for oscillatably mounting said support, means for positioning said support at one part thereof a predetermined distance from said first named means, and for preventing lateral displacement of said support relative to said first named means, said support being so mounted in said ring that it is free to expand at other parts thereof.

10. In a gyroscopic compass, a rotor, a support therefor, means for oscillatably mounting said support, said means comprising bearings for said support at opposite sides thereof, one of said bearings having means for positioning said support a predetermined distance from said first named means and for preventing lateral displacement of said support relative to said first named means, and the other of said bearings adapted to permit expansion of said support.

11. In a gyroscopic compass, a rotor, a support therefor, a ring in which said support is journaled, means for anchoring said support to said ring at one side, said support being freely movable relative to said ring at the opposite side.

In testimony whereof I have affixed my signature.

LESLIE F. CARTER.